United States Patent
Hinnant et al.

(10) Patent No.: US 11,012,485 B1
(45) Date of Patent: *May 18, 2021

(54) MULTI-MEDIA REDIRECTION FOR MEDIA APPLICATIONS

(71) Applicant: Microsoft Technology Licensing, LLC, Redmond, WA (US)

(72) Inventors: Neil Rust Hinnant, Seattle, WA (US); Isuru Chamara Pathirana, Bellevue, WA (US); Sandeep Patnaik, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,179

(22) Filed: Jan. 2, 2020

(51) Int. Cl.
*H04L 29/06* (2006.01)
*G06F 9/455* (2018.01)

(52) U.S. Cl.
CPC ........ *H04L 65/601* (2013.01); *G06F 9/45558* (2013.01); *H04L 65/607* (2013.01); *G06F 2009/4557* (2013.01); *G06F 2009/45562* (2013.01); *G06F 2009/45575* (2013.01); *G06F 2009/45595* (2013.01)

(58) Field of Classification Search
CPC ....... G06F 2009/45595; G06F 9/45558; H04L 67/02; H04L 67/08; H04L 67/2814; H04L 67/2823; H04L 67/2842; H04L 67/42
See application file for complete search history.

(56) References Cited

U.S. PATENT DOCUMENTS

| | | | | |
|---|---|---|---|---|
| 8,170,123 B1* | 5/2012 | Hobgood | ............. | G06F 9/5061 375/240.26 |
| 9,292,060 B1 | 3/2016 | Marr et al. | | |
| 10,147,115 B1* | 12/2018 | Bidarkar | ............ | G06Q 30/0246 |
| 10,742,706 B1* | 8/2020 | Zhu | ........................ | H04L 65/607 |
| 2002/0116708 A1* | 8/2002 | Morris | ............. | H04N 21/4314 725/37 |

(Continued)

OTHER PUBLICATIONS

"Configuring HTML5 Multimedia Redirection", Retrieved from: https://docs.vmware.com/en/VMware-Horizon-7/7.9/horizon-remote-desktop-features/GUID-6A68ECA4-6B9C-43C5-B437-D39B71005BAD.html, May 31, 2019, 1 Pages.

(Continued)

*Primary Examiner* — Jerry B Dennison
(74) *Attorney, Agent, or Firm* — Alleman Hall Creasman & Tuttle LLP

(57) ABSTRACT

A computer system is provided that includes at least one processor configured to execute a host virtual machine configured to host a session with at least one client computer device. The host virtual machine includes an operating system having a multi-media framework for rendering media content. The at least one processor is further configured to execute a media application configured to access media content from a media source, process encoded media content from the media application using the multi-media framework, and execute a multi-media redirection module configured to intercept the encoded media content from being processed by a decoding module of the multi-media framework. The multi-media redirection module is configured to redirect the encoded media content to the at least one client computer device.

20 Claims, 7 Drawing Sheets

(56) References Cited

U.S. PATENT DOCUMENTS

| | | | |
|---|---|---|---|
| 2010/0106798 A1* | 4/2010 | Barreto | G06F 16/957 709/217 |
| 2013/0088569 A1 | 4/2013 | Fredericks | |
| 2014/0344332 A1* | 11/2014 | Giebler | H04L 67/42 709/203 |
| 2015/0264149 A1* | 9/2015 | Guo | G06F 16/48 709/203 |
| 2015/0382034 A1* | 12/2015 | Thangaraj | H04L 67/2828 709/231 |
| 2016/0080780 A1* | 3/2016 | Oman | H04L 47/722 725/10 |
| 2017/0104797 A1* | 4/2017 | Venkatesh | H04L 65/1069 |
| 2017/0142184 A1* | 5/2017 | Fausak | H04L 67/1002 |
| 2018/0007400 A1* | 1/2018 | Chen | H04N 21/2343 |
| 2018/0213274 A1* | 7/2018 | Song | H04N 21/238 |
| 2018/0213301 A1* | 7/2018 | Cheung | H04N 21/8543 |
| 2018/0349283 A1 | 12/2018 | Bhatia et al. | |
| 2019/0207996 A1* | 7/2019 | Sehgal | H04N 21/234 |
| 2019/0342365 A1 | 11/2019 | Vysotsky et al. | |
| 2020/0068171 A1* | 2/2020 | Fadili | H04M 3/567 |
| 2020/0204858 A1* | 6/2020 | Olson | H04N 21/23106 |
| 2020/0252473 A1* | 8/2020 | Kumar | G06F 16/955 |

OTHER PUBLICATIONS

"HTML5 Multimedia Redirection" Retrieved from:https://docs.citrix.com/en-us/citrix-virtual-apps-desktops/multimedia/html5-multimedia-redirection.html, Nov. 27, 2018, 3 Pages.

"Terminator 6 Dark Fate Trailer (4K ULTRA HD) New 2019" Retrieved from: https://www.youtube.com/watch?v=IzS7ga4twH4, Retrieved Date: May 25, 2019, 2 Pages.

"Protocol Buffers", Retrieved from: https://web.archive.org/web/20191215012617/https://developers.google.com/protocol-buffers/, Retrieved Date: Dec. 15, 2019, 2 Pages.

"Non Final Office Action Issued in U.S. Appl. No. 16/733,183", dated Sep. 18, 2020, 21 Pages.

"Notice of Allowance Issued in U.S. Appl. No. 16/733,183", dated Jan. 22, 2021, 10 pages.

"International Search Report and Written Opinion Issued in PCT Application No. PCT/US20/061892", dated Feb. 22, 2021, 11 pages.

"International Search Report and Written Opinion Issued in PCT Application No. PCT/US20/062449", dated Jan. 26, 2021, 12 pages.

Rodriguez-Silva, et al., "Improving the Virtualization of Rich Applications by Combining VNC and Streaming Protocols at the Hypervisor Layer", In Journal of Software: Practice and Experience, vol. 46, Issue 5, May 21, 2015, pp. 625-644.

* cited by examiner

MULTI-MEDIA REDIRECTION FOR MEDIA APPLICATIONS

BACKGROUND

In virtual environments, end users may use client devices to connect to a virtual machine running on server hardware, which may provide the end user with the benefits of added compute power, application compatibility, security and regulatory compliance, and a reduction in overall cost for the end user. Typically, these end users may consume media through media player applications, which can potentially increase the workload placed on the server hardware and increase associated costs.

SUMMARY

A computer system is provided that may include at least one processor configured to execute a host virtual machine configured to host a session with at least one client computer device. The host virtual machine may include an operating system having a multi-media framework for rendering media content. The at least one processor may be further configured to execute a media application configured to access media content from a media source, process encoded media content from the media application using the multi-media framework, and execute a multi-media redirection module configured to intercept the encoded media content from being processed by a decoding module of the multi-media framework. The multi-media redirection module may be configured to redirect the encoded media content to the at least one client computer device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Cloud platform services may provide virtualized desktop environments for end users that may utilize a client computer device to connect to a virtual machine running on a server device of the cloud platform. Typically, the computer hardware and network capabilities of the cloud platform are more powerful than the client computer devices of the end users. Thus, by hosting these end users on the virtualized desktop environment, the cloud platform may provide those users with added compute power, as well as other potential benefits such as improved application compatibility, security/regulatory compliance, and an overall reduction of associated compute costs.

In some examples, these cloud platform services may provide virtual desktop infrastructure for enterprises that have multiple end users and client devices. The users of these enterprises may consume media, such as, for example, video and/or audio media that is stored locally on the cloud platform for that enterprise or stored by remote media sources and streamed to the virtualized desktop environment run on the cloud platform. Typically, the media content being provided by a media source is decoded on a virtual machine that is hosting an end user, and then display frames for the virtualized desktop that is presenting that media content are re-encoded and streamed to the client computer device of the user over a remote desktop protocol. The client computer device may then decode those display frames and present them to the user via a display of the client computer device.

The decoding and subsequent encoding process performed on the virtual machine may consume a large amount of compute resources of the server hardware. In one particular example, video rendering processes for video streaming may potentially consume 20%-40% of central processing unit (CPU) resources of the server device running the virtual machine. These issues may be further exacerbated in multi-session virtualized desktop environment deployments where multiple users share an operating system (OS) instance on a VM. For example, if more than one user attempts to stream video content through the shared host VM, all of the CPU resources for that VM may potentially be consumed by the associated decoding/encoding/rendering processes, thus potentially degrading the user experience of all of the users being hosted by that VM.

Figure 1:
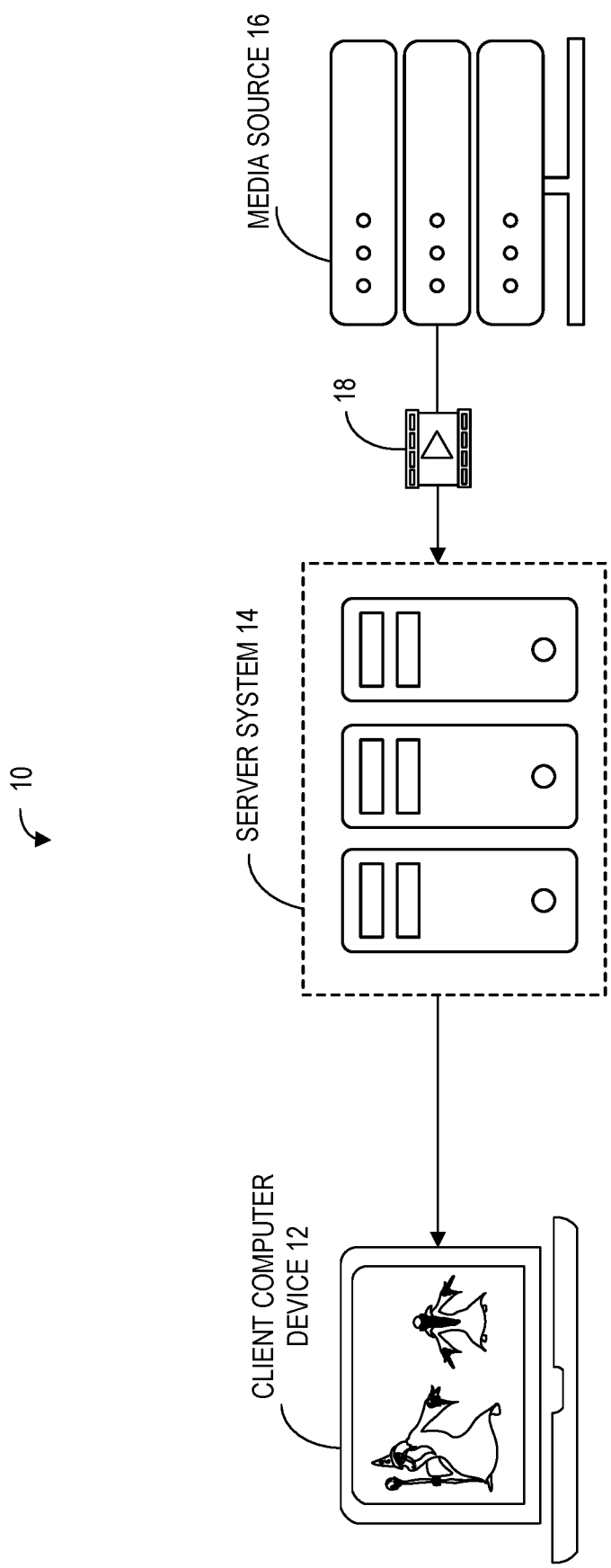
FIG. 1 is a schematic view of an example computer system for performing multi-media redirection of the present description.

To address the issues discussed above, FIG. 1 illustrates an example computer system 10 for a virtualized desktop environment that performs multi-media redirection to reduce the compute workload on the server hardware running the virtualized desktop environment, as will be discussed in more detail below. As illustrated in FIG. 1, the computer system 10 includes one or more client computer devices 12, a server system 14, and one or more media sources 16. End users of the one or more client computer devices 12 may connect to virtual machines run on the server system 14. Using applications executed within the host operating system of the VM, such as, for example, a media application that plays media content or a web browser application, the end user may interact with media stored by the media source 16.

In one example, the media source 16 may be local to the server system 14, and may be included in the server system 14. In another example, the media source 16 may be remote to both the client computer devices 12 and the server system 14. For example, the server system 14 may be configured to communicate with a remote media source over a communication network such as a Wide Area Network (WAN). As a specific example, an end user may interact with a media application executed within the host VM to trigger a media experience for viewing media stored on the media source 16. The media application may, for example, take the form of a media streaming application that facilitates the streaming and display of media content retrieved from the media source 16. Typically, the streaming video and/or audio is sent to the server system 14 as encoded media 18, and processed by the host VM executing the media application that is playing the steaming video and/or audio.

As discussed above, typical virtualized environment implementations will perform media rendering processes that include decoding the encoded media 18, and presenting the media content via the virtualized desktop environment, encoding display/audio frames for the virtualized desktop environment, and then sending the encoded display/audio frames to the client computer device 12 for presentation to the end user. To reduce the computational burden placed on the hardware of the server system 14 caused by the decode/encode processes, the server system 14 may implement multi-media redirection to pass the encoded media 18 received from the media source 16 to the client computer device 12 without performing encoding or decoding processes on the server system 14.

Figure 2:
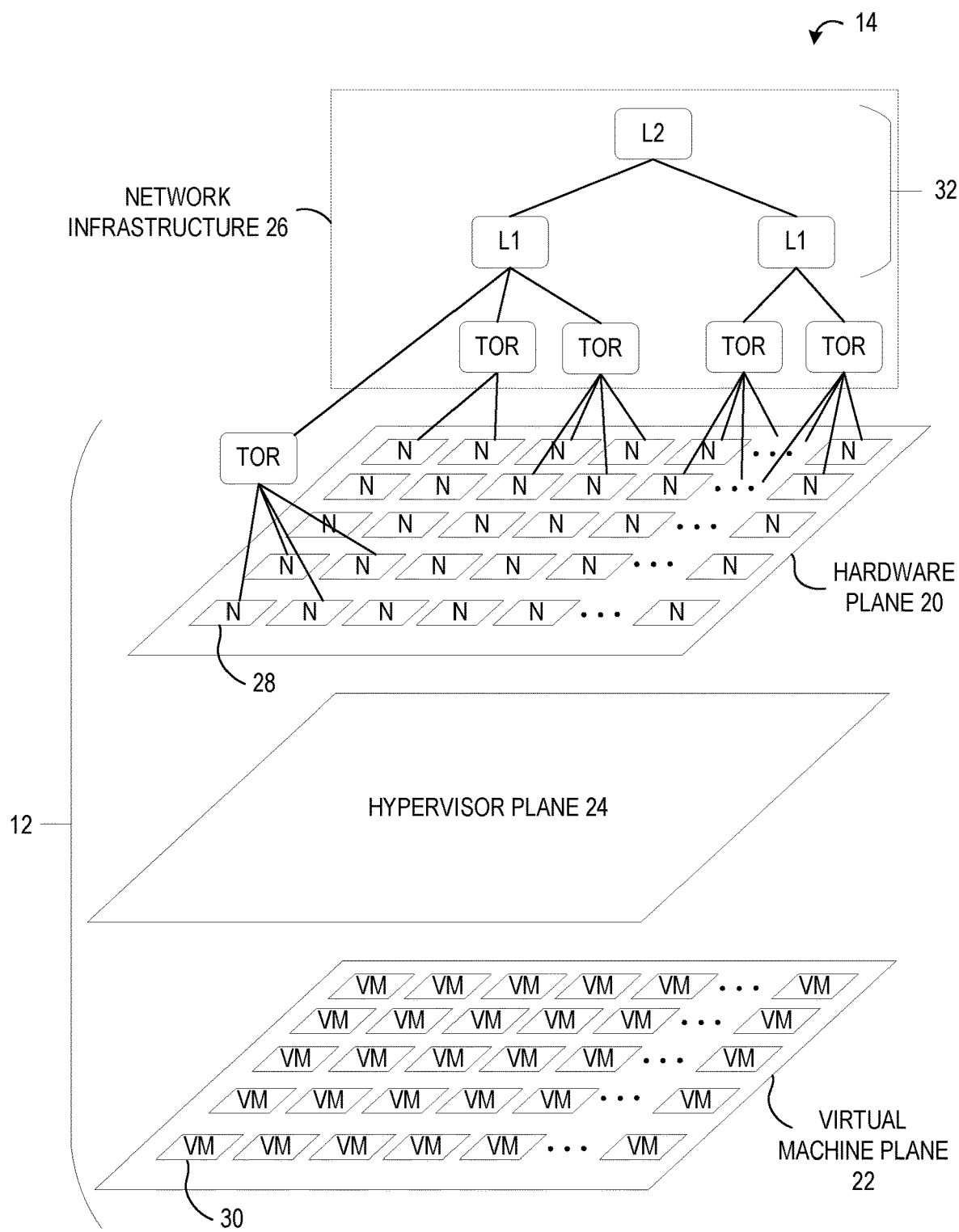
FIG. 2 is a schematic view of an example server system of the computer system of FIG. 1.

FIG. 2 illustrates an example of the server system 14. The server system 14 may include hardware plane 20, a virtual machine plane 22, a hypervisor plane 24, and network infrastructure 26 that are collectively configured to operate a cloud platform. The hardware plane 20 includes a collection of nodes 28 (each denoted by the symbol "N" in FIG. 2) that may include processors, graphics processing units (GPU), volatile memory, and other computer components configured to run host server instances. The host server instances executed by the nodes 28 of the hardware plane 20 are configured to communicate with one or more hypervisors of the hypervisor plane 24. The one or more hypervisors of the hypervisor plane 24 may create, handle, and monitor a plurality of virtual machines 30 (each denoted by the symbol "VM" in FIG. 2) of the virtual machine plane 22. Through the hypervisor plane 24, each virtual machine 30 of the virtual machine plane 22 may be hosted and run by the hardware components of one or more nodes 28 of the hardware plane 20. In this manner, the plurality of virtual machines 30 of the virtual machine plane 22 may share virtualized hardware resources managed by the hypervisor plane 24. Each virtual machine 30 provides a virtualized desktop environment within which software, such as a web browser application, a media player application, and other types of software may be executed.

In one example, the computer system 14 corresponds to a data center environment that communicatively couples the plurality of nodes 28 via standard network infrastructure. For example, the network infrastructure 20 may include typical network infrastructure, such as server racks including top-of-rack (TOR) network switches. The computer system 14 may include a plurality of node clusters that each have an associated TOR network switch. Network infrastructure 20 may further include higher-level switching infrastructure 32 (L1) and (L2) that connects the TOR network switches together. The higher-level switching infrastructure 32 may take the form of any suitable networking architecture, and may be driven by any suitable routing protocol(s). In the illustrated example, the higher-level infrastructure 32 includes a collection of aggregation switches L1 and core switches L2. However, it will be appreciated that the higher-level switching infrastructure may include any suitable number of levels of switches.

The virtual machines 30 of the virtual machine plane 22 provide a virtual computing environment within which users of the server system 14 may access and run applications, such as, for example, a web browser, media applications, etc. As will be discussed in more detail below, these virtual machines 30 of the virtual machine plane 22 may be configured to implement multi-media redirection to reduce a compute workload placed on nodes of the hardware plane 20 caused by decoding and encoding processes typically performed for streaming media.

Additionally, it should be appreciated that the server system 14 is not limited to the datacenter/cloud platform example shown in FIG. 2. In other examples, the server system 14 may take the form of one or more computer devices configured to run a virtualized desktop environment. Using client computer devices 12, an associated user may connect to virtualized desktop environments run by the one or more computer devices to access software run within the virtualized desktop environment, which may be configured to implement the multi-media redirection functions and processes described herein.

Figure 3:
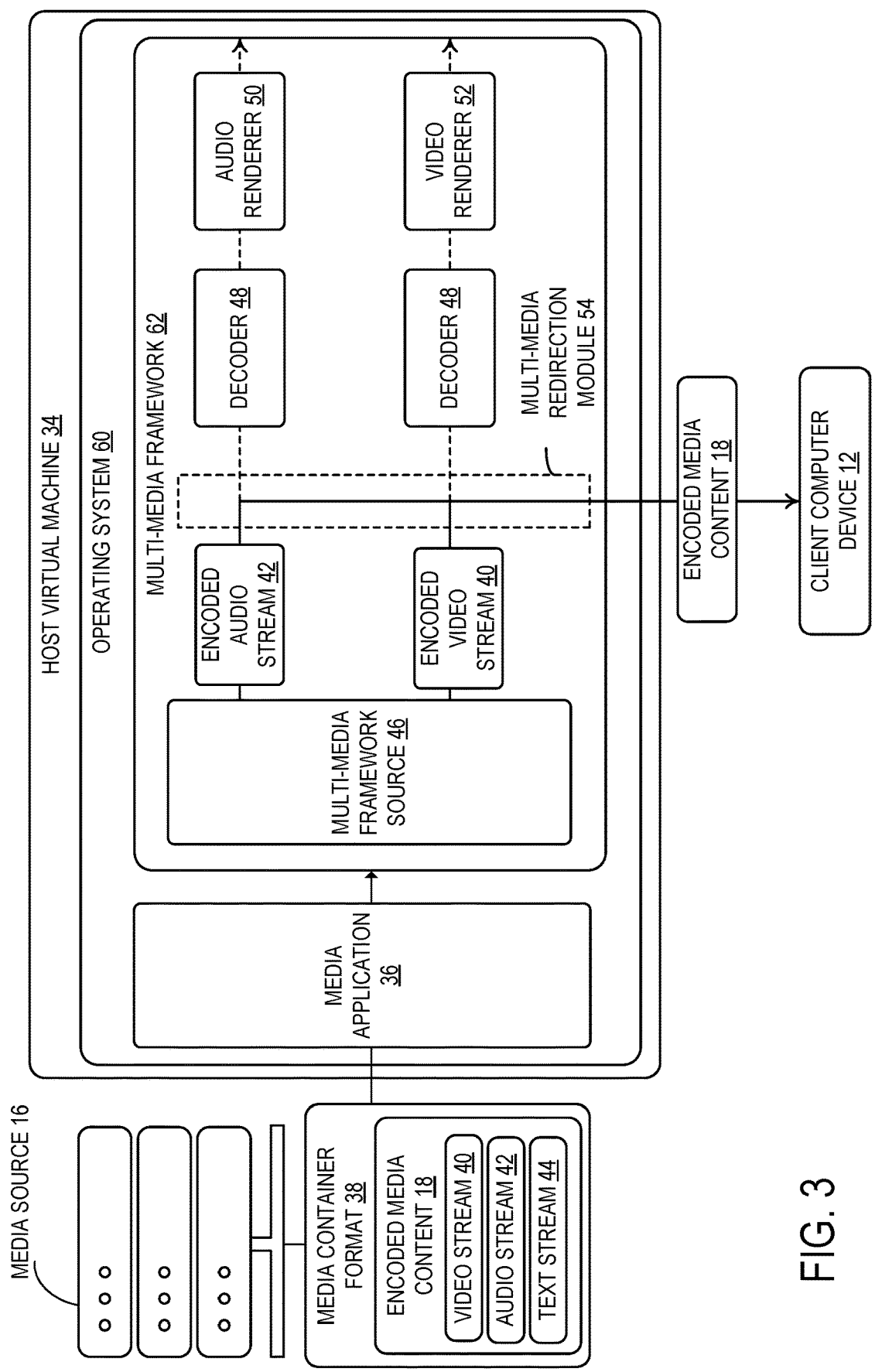
FIG. 3 is a schematic view of a media application and a multi-media framework of an operating system implementing a multi-media redirection module for the computer system of FIG. 1.

FIG. 3 illustrates an example host virtual machine 34 configured to perform multi-media redirection techniques to address the issues discussed above. The host virtual machine 34 may take the form of one of the virtual machines 30 of the virtual machine plane 22 of the cloud platform described with reference to FIG. 2. However, it should be appreciated that the host virtual machine 34 may also be implemented in non-cloud platform forms of server system 14.

The host virtual machine 34 may be executed by at least one processor of the server system 14. The host virtual machine 34 may be configured to host a session with at least one client computer device 12, and may host applications run within an operating system of the host virtual machine 34. The host virtual machine 34 may include an operating system 60 having a multi-media framework 62 for rendering media content. The multi-media framework 62 may provide a run time environment for media processing within the operating system 60, and includes an application programming interface (API) that may be used by media applications 36 being executed within the operating system 60 of the host virtual machine 34.

As illustrated, the media application 36 may be configured to access media content from a media source 16. Using a graphical user interface (GUI) of the media application 36, the end user may trigger a media experience for media content stored by the media source 16. In one example, the media source 16 may be local to the server system 14 running the host virtual machine 34. In another example, the media source 16 may be remote to the server system 14, and may be configured to send encoded media content 18 to the server system 14 over a WAN.

After a media experience is triggered in the media application 36, the host virtual machine 34 may be configured to receive encoded media content 18 from the media source 16 for the triggered experience. The encoded media content 18 may be encoded using any suitable algorithm. In one example, the encoded media content 18 is received in a media container format 38 that includes one or more of a video stream 40, audio stream 42, and a text stream 44. As a specific example, the media container format 38 may be an MP4 format, WAV format, AVI format, or another type of media container format 38.

The encoded media content 18 received by the host VM 34 may be received at the media application 36. The media application 36 may include program logic that makes an API call to the multi-media framework 62 to perform media processing on the encoded media content 18. The encoded media content 18 is then passed to the multi-media framework 62, and processed by the multi-media framework 62 of the operating system 60 of the host virtual machine 34. The multi-media framework 62 may be configured to provide rendering pipeline and infrastructure for media rendering of the encoded media content 18. The multi-media framework 62 may load a multi-media framework source 46 based on the type of media container format 38 of the encoded media content 18. The multi-media framework source 46 may be configured to demux the encoded media content 18 in the media container format 38 into independent video, audio, and text streams. Typically, as illustrated in FIG. 3, the independent encoded audio stream 42 and encoded video stream 40 would be processed by audio and video rendering pipelines of the multi-media framework 62. For example, the encoded audio stream 42 and encoded video stream 40 may be respectively processed by media transform modules of the multi-media framework 62 such as decoders 48 that decompress the audio and video streams. The decompressed audio and video streams may then be respectively passed to a streaming audio renderer 50 and a streaming video renderer 52 to prepare the video and audio content for presentation. As discussed above, these decoding and rendering processes performed on the host VM 34 will consume hardware resources of the server device running the host VM 34, which may potentially degrade the user experience of other users hosted in a multi-session operating system of the host virtual machine 34.

Figure 4:
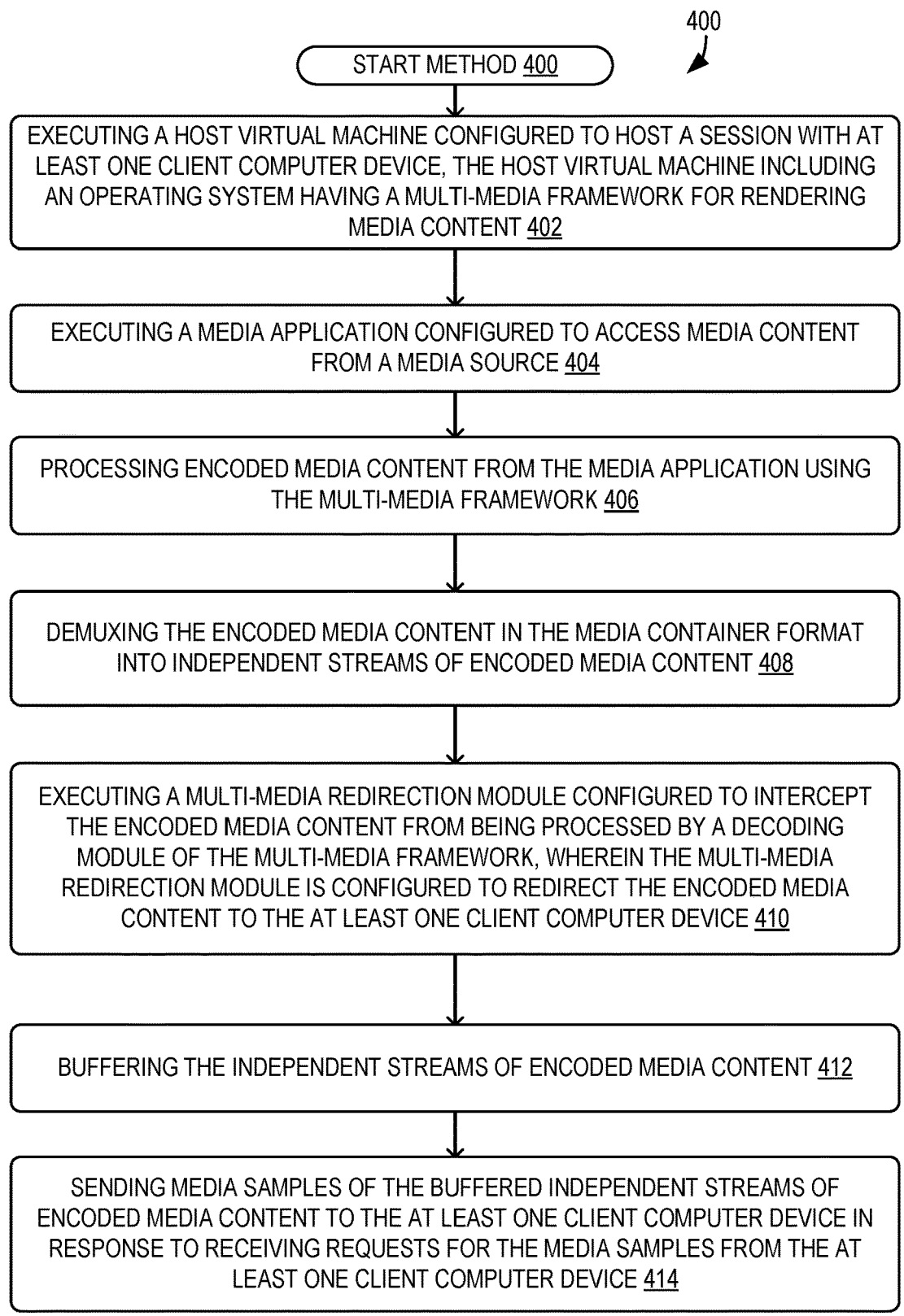
FIG. 4 is a flowchart of a method for performing multi-media redirection implemented by the computer system of FIG. 1.

To address these issues, the host virtual machine 34 may be configured to implement a multi-media redirection module 54 configured to redirect the encoded media content 18, including the encoded audio stream 42 and encoded video stream 40 to the client computer device 12. For example, rather than building a full multi-media framework topology with media transform modules and renderers, the host virtual machine 34 may be configured to load a multi-media redirection module 54 that acts as a media sink and render from the multi-media framework source 46 directly to the multi-media redirection module 54. FIG. 4 is a flowchart of a method 400 implemented by the server system 14 running the host virtual machine 34 to perform multi-media redirection. Method 400 may be executed using the system described above or utilizing other suitable hardware and software elements.

At 402, the method 400 may include executing a host virtual machine configured to host a session with at least one client computer device. The host virtual machine 34 may be executed by at least one processor of a server system 14, which may, for example, take the form of the cloud platform data center illustrated in FIG. 2. The host virtual machine 34 may include an operating system having a multi-media framework for rendering media content. In one example, the operating system may be a multi-session operating system configured to concurrently host a plurality of sessions for a plurality of client computer devices 12. The plurality of sessions may be hosted within the same multi-session operating system instance. Each session may implement the techniques and processes for multi-media redirection described herein.

At 404, the method 400 may include executing a media application configured to access media content from a media source. The media application 36 may be run within the host virtual machine 34. In a multi-session operating system example, each of the plurality of sessions may have an associated media application 36 instance run in the multi-session operating system. The media source 16 may, in one example, take the form of a 3rd party media service that streams media content such as video and/or audio. The media application 36 may be configured to access the media source 16 based on user input that triggers a media experience. In another example, the media source 16 may take the form of a storage device of the server system 14 that stores media content associated with the media application 36.

At 406, the method 400 may include processing encoded media content from the media application using the multi-media framework. The encoded media content 18 may be received by the host virtual machine 34 over a WAN in a remote media source example. As illustrated in FIG. 3, the encoded media content 18 may include one or more of an encoded video stream 40, an encoded audio stream 52, and an encoded text stream 44. The encoded streams of media content may be bundled in a media container format 38, such as, for example, an MP4 format, WAV format, etc.

At 408, the method 400 may include demuxing the encoded media content in the media container format into independent streams of encoded media content. For example, the multi-media framework 62 of the operating system 60 may include media transform modules that include processes for unpacking the media container format 38 and demuxing the encoded media content 18 into independent streams, such as, for example, an encoded video stream 40, and encoded audio stream 42, and/or an encoded text stream 44.

At 410, the method 400 may include executing a multi-media redirection module configured to intercept the encoded media content from being processed by a decoding module of the multi-media framework. The multi-media redirection module 54 may include a media sink, and the multi-media framework 62 of the operating system 60 may be configured to render directly to the media sink of the multi-media redirection module 54 from the source 46 rather than building a full rendering topology. The multi-media redirection module 54 may receive the encoded content from the multi-media framework 62, and redirect that encoded content to the associated client computer device 12 for that session. In this manner, the encoded media content 18 is not decoded by decoders 48 or processed by renderers 50 and 52 on the host virtual machine 34.

The encoded media content 18 being redirected to the client computer device 12 may be buffered and streamed to the client computer device 12 over a WAN. At 412, the method 400 may include buffering the independent streams of encoded media content. The independent streams of encoded media content, such as the encoded audio stream 42 and encoded video stream 40 may be temporarily stored in buffers on the host virtual machine 34.

At 414, the method 400 may include sending media samples of the buffered independent streams of encoded media content to the at least one client computer device in response to receiving requests for the media samples from the at least one client computer device. The client computer device 12 may request new media samples independently for each stream of encoded media content 18. For example, the client computer device 12 may request media samples for the encoded video stream 40 independently from requesting media sample for the encoded audio stream 40. In this manner, the client computer device 12 may request media samples for each independent stream of encoded media content (e.g. encoded audio stream, encoded video stream, etc.) at independent rates, and the host virtual machine 34 may send those media samples for each independent stream of encoded media content at the requested rates. Typically, video content will be larger in size than audio content, and thus may require a higher rate of video samples being sent to the client computer device 12.

Figure 5:
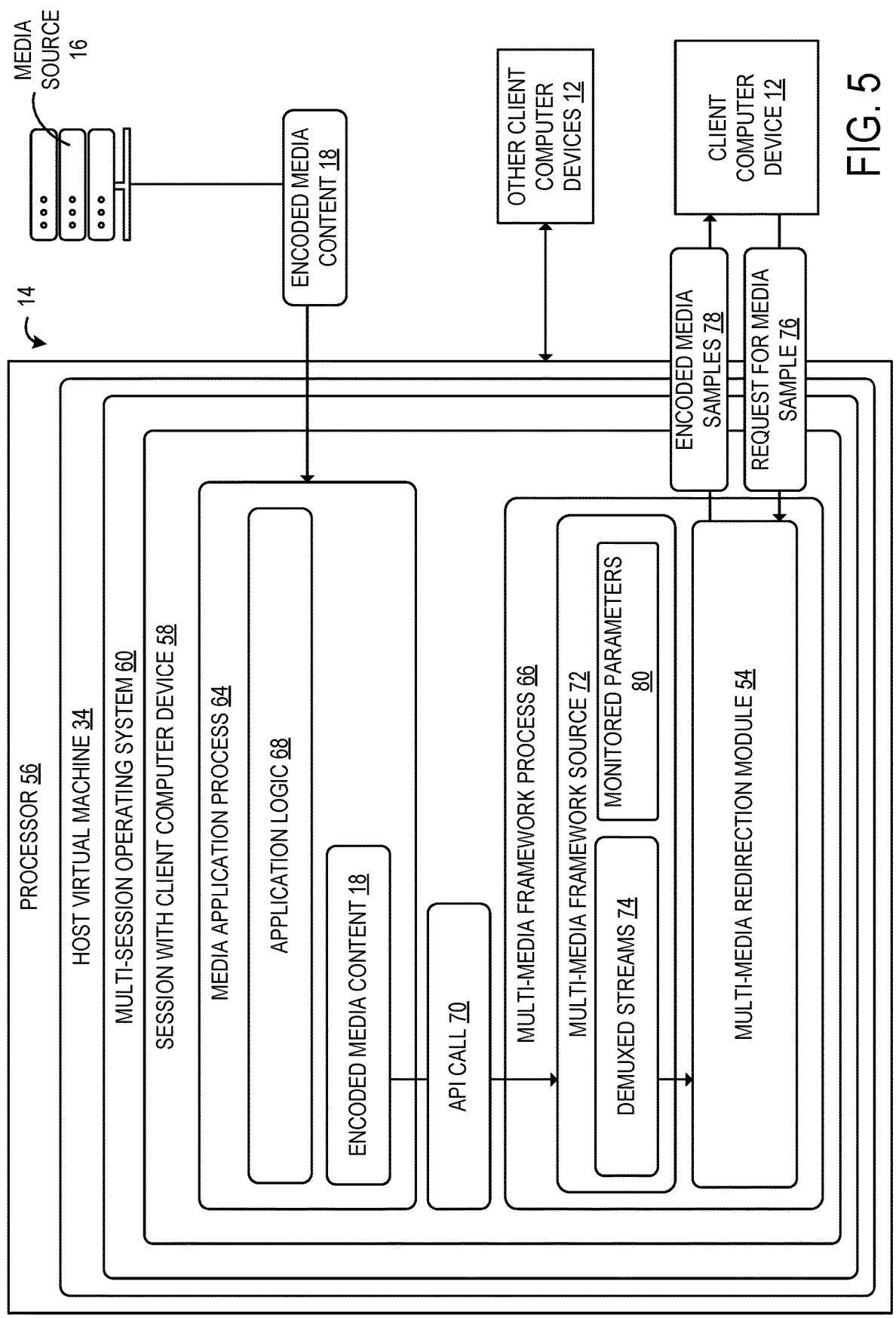
FIG. 5 is a schematic view of a software architecture for the media application and multi-media framework that implements multi-media redirection for the computer system of FIG. 1.

FIG. 5 illustrates an example server-side software architecture for implementing the multi-media redirection module 54 and the steps described in method 400. In the illustrated example, at least one processor 56 of a server device included in the server system 14 may be configured to execute a host virtual machine 34 configured to host a session 58 with at least one client computer device 12. In the illustrated example, the host virtual machine 34 implements a multi-session operating system 60 configured to concurrently host a plurality of sessions 58 for a plurality of client computer devices 12. Each session 58 may be associated with a different client computer device 12, and may run separate instances of application programs on the host virtual machine 34. For example, each session 58 may execute separate instances of a media application 36 configured to access media content from the media source 16.

Each session 58 run within the multi-session operating system 60 may be further configured to receive encoded media content 18 from the media source 16 in a media container format 38, as described above with reference to FIGS. 3 and 4. In one example, the encoded media content 18 may take the form of a media file stored on a storage device associated with the host virtual machine 34. In this example, the media source 16 may be the associated storage device that is local to the server system 14. However, it should be appreciated that the encoded media content 18 may take other suitable forms, such as, for example, dynamic streamed media content, HTTP Progressive Streaming content, or other forms of streamed media content received from a remote media source. Additionally, the encoded media content 18 may be received in a media container format that includes one or more of a video stream, audio stream, and a text stream. The video stream, audio stream, and text stream may be muxed in the media container format. It should be appreciated that the media container format may take the form of an MP4 format, WAV format, or any other suitable type of media container format.

Execution of the media application 36 may spin up a plurality of associated processes run within the multi-session operating system 60. As a specific example, a media application process 64 for the session 58 with the client computer device 58 and a multi-media framework process 66 may be run. In one example, the functions of the multi-media framework process 66 described herein may be included in a process of the multi-session operating system 60. In another example, the multi-media framework process 66 may be run in a separate processing thread.

Application logic 68 for the media application 36 may be run within the media application process 64. The application logic 68 may include program logic to for retrieving the encoded media content 18 based on a user of the media application 36 triggering a media viewing experience. The application logic 68 may further include program logic for making API calls 70 to the multi-media framework process 66 for rendering the encoded media content 18. The encoded media content 18 retrieved by the media application process 64 and/or a unique resource identifier for the encoded media content 18 may also passed to the multi-media framework process 66.

The multi-media framework process 66 executed by the processor 56 may be configured to process the encoded media content 18 received from the media application process 64. In one example, the multi-media process 66 may be configured to identify a format type of the encoded media content 18, such as a type of media container format 38, and then select a corresponding multi-media framework source 72. Among other functions, the multi-media framework source 72 may be configured to unpackage the encoded media content 18 and demux the encoded media content 18 into independent streams of encoded media content 74. The demuxed independent streams of encoded media content 74 may, for example, include an encoded video stream, and encoded audio stream, and/or an encoded text stream.

If multi-media redirection (MMR) is not currently enabled for the received encoded media content 18, then the multi-media framework process 66 may be configured to load a rendering pipeline for the demuxed streams of video, audio, and/or text. For example, the multi-media framework process 66 may be configured to load a plurality of media transform modules for processing the encoded media content. These media transform modules may, for example, include decoders 48 shown in FIG. 3, as well as other modules that perform other types of data transforms. The multi-media framework process 66 may also load a streaming audio renderer 50, streaming video renderer 52, etc. The multi-media framework process 66 may then process the demuxed independent streams of encoded media content 74 using the loaded rendering pipelines. In some examples, the rendering process may include other lower level processes of the multi-session operating system 60. Display frames for the rendered video content and audio frames for the rendered audio content may then be encoded and streamed of the client computer device 12 over the WAN.

On the other hand, when MMR is enabled, the multi-media framework process 66 may be configured to load the multi-media redirection module 54 that is configured to intercept the demuxed streams of media content 74 and perform the functions and processes described herein. In this manner, the demuxed streams of media content 74 are not decoded and rendered on the host virtual machine 34, providing the potential benefit of reducing a computational workload placed on the hardware running the host virtual machine 34.

In one example, the multi-media redirection module 54 may take the form of a media sink, and the multi-media framework source 72 may be configured to render directly to the multi-media redirection module 54 when MMR is enabled. Rather than processing the demuxed streams of encoded media content 74 using media transform modules as described above, the multi-media redirection module 54 may be configured to redirect the demuxed streams of encoded media content 74 to the corresponding client computer device 12 for that session 58. To redirect the media content, the multi-media redirection module 54 may be configured to handle transmission of the demuxed independent streams of encoded media data to a dynamic virtual channel (DVC) plugin implemented on the client computer device 12. The multi-media redirection module 54 may also handle communication of serialized messages with the DVC plugin on the client computer device 12. In one example, commands associated with playback and rendering of the encoded media content 18 may be serialized using a protocol such as, for example, an extended GOOGLE® PROTOCOL BUFFERS which is a language and platform neutral mechanism for serializing and deserializing structured data. However, it should be appreciated that other serialization protocols may also be implemented. The multi-media redirection module 54 may be configured to send and receive these commands with the client computer device 12 via serialized messages.

Additionally, when redirecting the encoded media content 18 to the client computer device 12, the MMR module 54 may be configured to buffer the independent streams of encoded media content 74, and send media samples of the buffered independent streams of encoded media content 74 to the at least one client computer device 12 in response to receiving requests for the media samples from the at least one client computer device 12. For example, the client computer device 12 may send a serialized message to the MMR module 54 that includes a request 76 for media samples for at least one of the streams of encoded media content. The MMR module 54 may then send the requested encoded media samples 78 stored in a buffer to the client computer device 12 over a dynamic virtual channel. In one example, the client computer device 12 may send separate requests 76 for each independent stream of encoded media content 74. For example, the client computer device 12 may request media samples for the encoded video content steam at a higher rate than media samples for the encoded audio content. Thus, the MMR module 54 may be configured to send media samples 78 for each of the independent streams of encoded media content 74 at independent rates based on requests 76 for the media samples received from the at least one client computer device 12.

As discussed above, the MMR module 54 which may take the form of a media sink of the multi-media framework 62, is loaded and executed when MMR is enabled for the encoded media content 18. In one example, the at least one processor 56 may be configured to determine whether to enable MMR, and whether to execute the MMR module 54 to intercept the encoded media content 18 or to allow the encoded media content 18 to be processed by the decoding module 48 and other media transform modules of the multi-media framework 62 based on one or more monitored parameters 80. In one example, the host virtual machine 34 may be configured to monitor a network parameter between the server system 14 and the at least one client computer device 12, and determine whether to enable MMR based on the monitored network parameter.

As another example, the host virtual machine 34 may be configured to monitor a current processing load of the at least one processor 56 running the host virtual machine 34, and determine whether to enable MMR based on the current processing load. As a specific example, if the current processing load on the at least one processor 56 is over a threshold level, the host virtual machine 34 may be configured to enable MMR and load the MMR module 54 and its associated media stack to intercept the encoded media content 18 from being processed by a rendering pipeline that may, for example, typically include a plurality of media transform modules and renderers. On the other hand, if the current processing load is below the threshold level and the monitored network parameter indicates that the network bandwidth is low, the host virtual machine may be configured to disable MMR and decode/render the encoded media content. The rendered frames may then be encoded with a compression level suitable for the network bandwidth between the server system and the client computer device.

As another example, the host virtual machine 34 may be configured to determine whether to enable MMR and load the MMR module 54 based on a user setting of the at least one client computer device 12. For example, an administrator may control a user setting to enable or disable MMR for the client computer device. The user setting may be sent to the host virtual machine 34 and stored for that client computer device. In one specific example, MMR may be independently enabled or disabled via user settings for different media sources 16.

As discussed above, the host virtual machine 34 may implement a multi-session operating system 60 that hosts sessions 58 with a plurality of client computer devices 12. Activity with each client computer device 12 may increase a processing workload placed on the at least one processor 56 running the host virtual machine 34. Thus, in one example, the host virtual machine 34 may be configured to determine an aggregate activity of the plurality of sessions 58 hosted by the multi-session operating system 60, and determine whether to execute the MMR module 54 based on an aggregate activity. As a specific example, if the aggregate activity of the plurality of sessions 58 is low because only one session is currently accessing encoding media content for streaming, then the host virtual machine 34 may be configured to not enable MMR and to allow decoding and rendering processes to be performed on host virtual machine 34. On the other hand, if the aggregate activity of the plurality of sessions 58 is high due to multiple sessions attempting to access ended media content, then the host virtual machine 34 may be configured to enable MMR and load the MMR module 54.

The host virtual machine 34 may be configured to enable or disable MMR dynamically based on changes to the monitored parameters 80. Additionally, it should be appreciated that the example monitored parameters discussed above are merely exemplary, and that the host virtual machine 34 may dynamically determine whether to enable MMR based on other parameters, such as a size of the encoded media content, a source of the encoded media content, etc.

Figure 6:
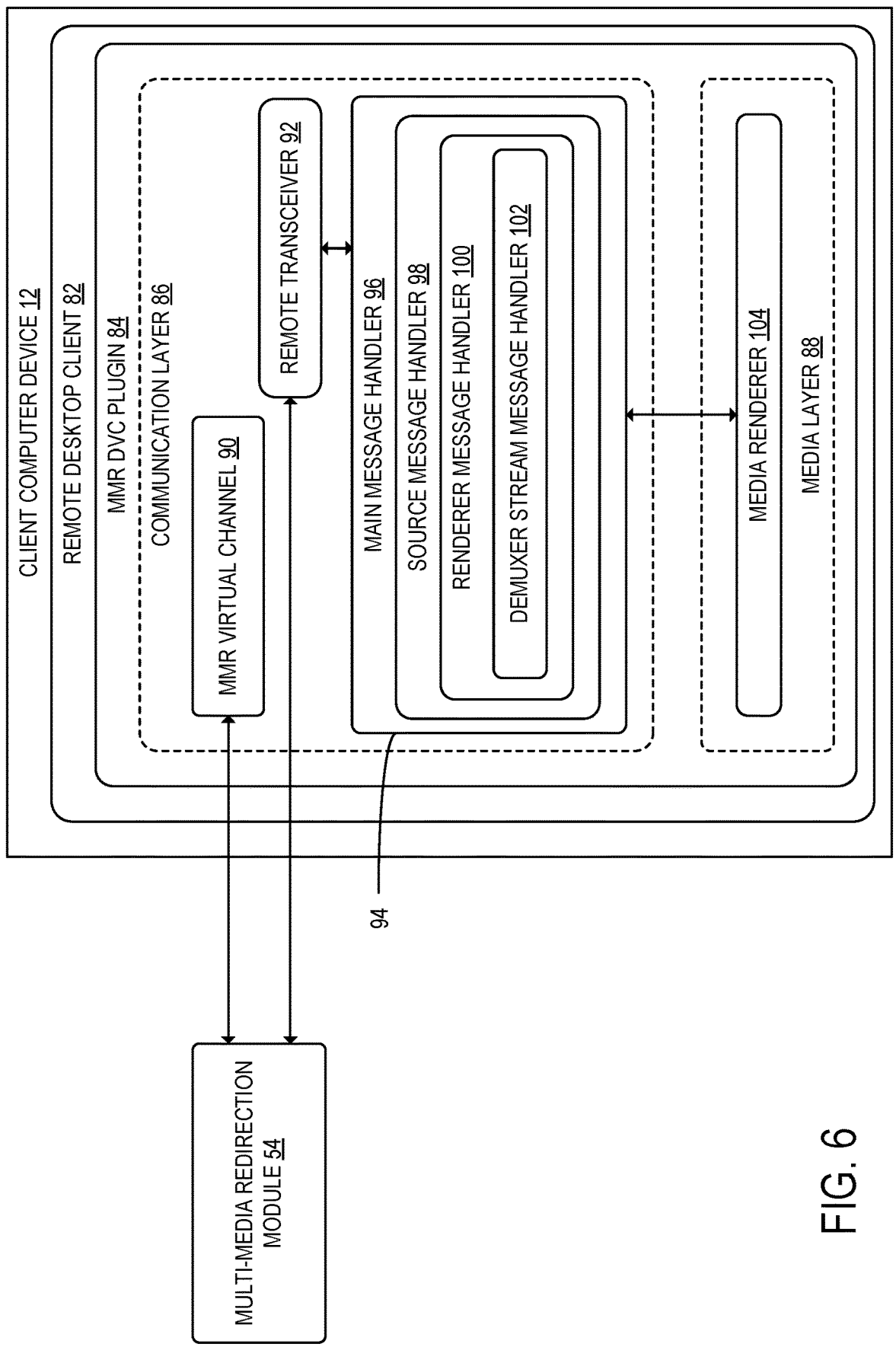
FIG. 6 is a schematic view of a software architecture for a remote desktop client that communicates with a multi-media redirection module implemented by the computer system of FIG. 1.

FIG. 6 illustrates an example remote desktop client 82 that may be executed by processors of each client computer device 12 to communicate with the host virtual machine 34. The remote desktop client 82 includes an MMR DVC plugin 84 that is configured to interact with the MMR module 54 executed by the host virtual machine 34. When MMR is enabled by the host virtual machine 34, the MMR DVC plugin 84 may be loaded on the remote desktop client 82. On the other hand, if MMR is not enabled, the remote desktop client 82 may be configured to use typical remoting techniques and processes.

The MMR DVC plugin 84 includes a communication layer 86 and a media layer 88. The communication layer 86 is configured to handle communication between the MMR DVC plugin 84 and the MMR module 54 of the host virtual machine 34. The communication layer 86 may include an MMR virtual channel 90 configured to open a channel with the MMR module 54 of the host virtual machine 34. An instance of the MMR virtual channel 90 may be created for each instance of a media application 36 that is opened for the session. A remote transceiver 92 may be created when a new connection from the host virtual machine 34 is accepted, such as, for example, when an instance of a media application 36 on the host virtual machine 34 is opened and media content is accessed.

The remote transceiver 92 may be configured to send and receive messages 94 to/from the MMR module 54 of the host virtual machine 34. As illustrated, the messages 94 are structured to include a main message handle 96, a source message handle 98, a renderer message handler 100, and a demuxer stream message handler 102. The main message handler 96 may be configured to included data for negotiating versioning information between the client and host.

The messages 94 may include a source message handler 98 for each multi-media framework source 72. Each source message handler 98 further includes a respective renderer message handler 100 for handling messages that may include data regarding a playback state for the encoded media content 18. For example, the renderer message handler 100 may communicate whether the media content should be paused, seeked to a target position, etc. The renderer message handler 100 may also be used to report a status of playback to the host virtual machine 34, such as a playback position, whether playback has ended, or errors in playback.

Each renderer message handler 100 further includes a demuxer stream message handler 102 configured to include data for handling demux based operations, such as, for example, requesting a media sample for each demuxed independent stream of encoded media 74. That is, the client computer device 12 may request new media samples for specific streams of encoded media content via the demuxer stream message handler 102. As discussed above, the client computer device 12 may request media content at independent rates for each demuxed stream of media content. For example, the client computer device 12 may request media samples for video media content at a higher rate than media samples for audio media content.

The media layer 88 includes a media renderer 104 that may send and receive messages 104 via the remote transceiver 92 of the communication layer 86. Using the messages 94, the media renderer 104 may request media samples for the streams of encoded media content 74, such as, for example, media samples for encoded video content, media sample for encoded audio content, and media samples for encoded text content. The media renderer 104 may then decode the received media samples, and render the decoded media samples for presentation to a user via output devices of the client computer device 12, such as a display, speakers, etc. It should be appreciated that the media renderer 104 may use any suitable rendering techniques for the platform of the client computer device 12.

In the manner discussed above, encoded media content may be redirected to the client computer device 12 such that the media content is not decoded or rendered on the host virtual machine 34. Rather, the encoded media content is redirected and streamed to the client computer device 12, which is configured to decode and render the media content for display. Thus, by performing MMR and avoiding decoding/rendering processes on the host virtual machine, the processing workload on the hardware running the host virtual machine may be reduced.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
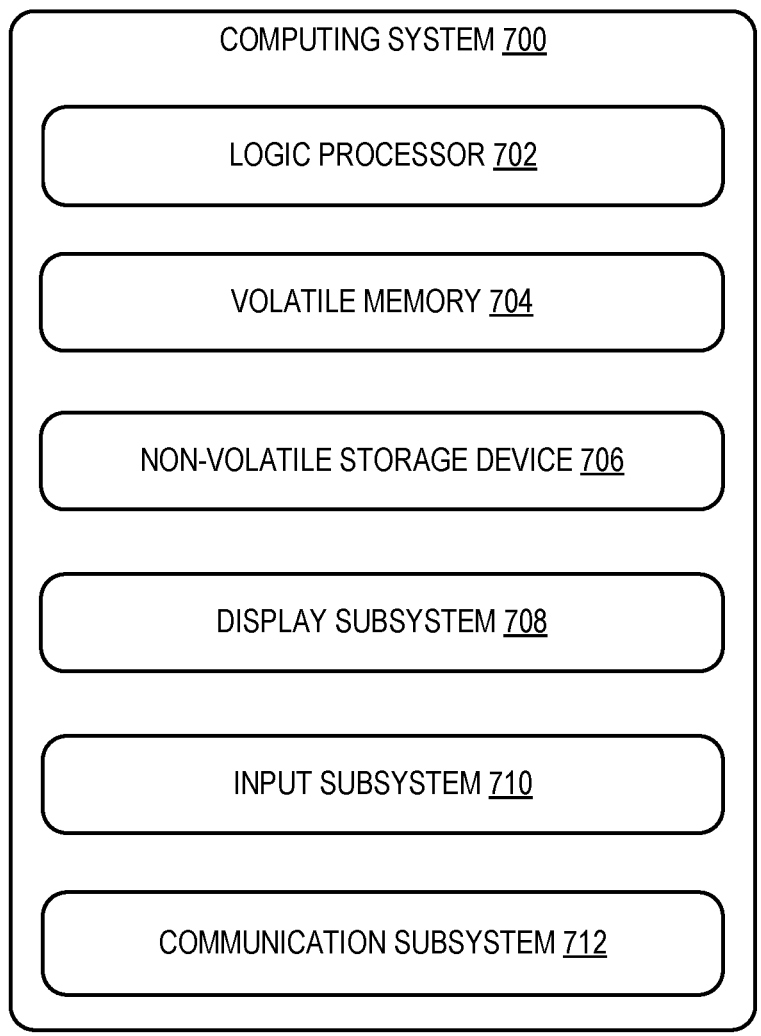
FIG. 7 is a schematic view of an example computing environment in which the computer system of FIG. 1 may be enacted.

FIG. 7 schematically shows a non-limiting embodiment of a computing system 700 that can enact one or more of the methods and processes described above. Computing system 700 is shown in simplified form. Computing system 700 may embody the client computer device 12 and the server devices of the server system 14 described above and illustrated in FIGS. 1 and 2. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computer system comprising at least one processor configured to execute a host virtual machine configured to host a session with at least one client computer device. The host virtual machine includes an operating system having a multi-media framework for rendering media content. The at least one processor is further configured to execute a media application configured to access media content from a media source, process encoded media content from the media application using the multi-media framework, and execute a multi-media redirection module configured to intercept the encoded media content from being processed by a decoding module of the multi-media framework. The multi-media redirection module is configured to redirect the encoded media content to the at least one client computer device. In this aspect, additionally or alternatively, the encoded media content may be dynamic streamed media content. In this aspect, additionally or alternatively, the encoded media content may be received in a media container format that includes one or more of a video stream, audio stream, and a text stream, and the at least one processor may be configured to demux the encoded media content in the media container format into independent streams of encoded media content. In this aspect, additionally or alternatively, the independent streams of encoded media content may include one or more of the video stream, audio stream, and the text stream. In this aspect, additionally or alternatively, the multi-media redirection module may be configured to buffer the independent streams of encoded media content, and send media samples of the buffered independent streams of encoded media content to the at least one client computer device in response to receiving requests for the media samples from the at least one client computer device. In this aspect, additionally or alternatively, the multi-media redirection module may be configured to send media samples for each of the independent streams of encoded media content at independent rates based on requests for the media samples received from the at least one client computer device. In this aspect, additionally or alternatively, the at least one processor may be configured to determine whether to execute the multi-media redirection module to intercept the encoded media content or to allow the encoded media content to be processed by the decoding module of the multi-media framework based on one or more monitored parameters. In this aspect, additionally or alternatively, the one or more monitored parameters may be selected from the group consisting of a network parameter between the computer system and the at least one client computer device, a current processing load of the at least one processor of the computer system, a size of the encoded media content, and a user setting of the at least one client computer device. In this aspect, additionally or alternatively, the operating system may be a multi-session operating system configured to concurrently host a plurality of sessions for a plurality of client computer devices. In this aspect, additionally or alternatively, the at least one processor may be configured to determine whether to execute the multi-media redirection module based on an aggregate activity of the plurality of sessions hosted by the multi-session operating system.

Another aspect provides a method comprising, at a processor of a server device, executing a host virtual machine configured to host a session with at least one client computer device. The host virtual machine includes an operating system having a multi-media framework for rendering media content. The method further comprises executing a media application configured to access media content from a media source, processing encoded media content from the media application using the multi-media framework, and executing a multi-media redirection module configured to intercept the encoded media content from being processed by a decoding module of the multi-media framework. The multi-media redirection module is configured to redirect the encoded media content to the at least one client computer device. In this aspect, additionally or alternatively, the encoded media content may be dynamic streamed media content. In this aspect, additionally or alternatively, the encoded media content may be received in a media container format that includes one or more of a video stream, audio stream, and a text stream, and the method may further comprise demuxing the encoded media content in the media container format into independent streams of encoded media content. In this aspect, additionally or alternatively, the independent streams of encoded media content may include one or more of the video stream, audio stream, and the text stream. In this aspect, additionally or alternatively, the method may further comprise buffering the independent streams of encoded media content, and sending media samples of the buffered independent streams of encoded media content to the at least one client computer device in response to receiving requests for the media samples from the at least one client computer device. In this aspect, additionally or alternatively, the method may further comprise sending media samples for each of the independent streams of encoded media content at independent rates based on requests for the media samples received from the at least one client computer device. In this aspect, additionally or alternatively, the method may further comprise determining whether to execute the multi-media redirection module to intercept the encoded media content or to allow the encoded media content to be processed by the decoding module of the multi-media framework based on one or more monitored parameters. In this aspect, additionally or alternatively, the one or more monitored parameters may be selected from the group consisting of a network parameter between the server device and the at least one client computer device, a current processing load of the at least one processor of the server device, a size of the encoded media content, and a user setting of the at least one client computer device. In this aspect, additionally or alternatively, the operating system may be a multi-session operating system configured to concurrently host a plurality of sessions for a plurality of client computer devices.

Another aspect provides a server system comprising at least one processor configured to execute a host virtual machine that implements a multi-session operating system configured to concurrently host a plurality of sessions for a plurality of client computer devices, the multi-session operating system having a multi-media framework for rendering media content. The at least one processor is further configured to execute an instance of a media application for one or more of the plurality of sessions, the media application being configured to access media content from a media source. The processor is further configured to determine that an aggregate activity of the plurality of sessions for the host virtual machine is above a threshold level, enable multi-media redirection for the one or more of the plurality of sessions based on the determined aggregate activity, process encoded media content from the instance of the media application using the multi-media framework, and execute a multi-media redirection module configured to intercept the encoded media content from being processed by a decoding module of the multi-media framework. The multi-media redirection module is configured to redirect encoded media content to respective client computer devices of the one or more plurality of sessions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
at least one processor configured to execute a host virtual machine configured to host a session with at least one client computer device, the host virtual machine including an operating system having a multi-media framework for rendering media content;
wherein the at least one processor is further configured to:
execute a media application configured to access media content from a media source;
process encoded media content from the media application using the multi-media framework, wherein the encoded media content is in a media container format that includes two or more of a video stream, an audio stream, and a text stream;
demux the encoded media content in the media container format into independent streams of encoded media content; and
execute a multi-media redirection module configured to intercept the encoded media content from being processed by a decoding module of the multi-media framework, wherein the multi-media redirection module is configured to redirect the encoded media content to the at least one client computer device, wherein
the multi-media redirection module is configured to buffer the independent streams of encoded media content, and wherein
the multi-media redirection module is configured to send media samples of the buffered independent streams of encoded media content to the at least one client computer device in response to receiving requests for the media samples from the at least one client computer device.

2. The computer system of claim 1, wherein the encoded media content is dynamic streamed media content.

3. The computer system of claim 1, wherein the multi-media redirection module is configured to send media samples for each of the independent streams of encoded media content at independent rates based on requests for the media samples received from the at least one client computer device.

4. The computer system of claim 1, wherein the at least one processor is configured to determine whether to execute the multi-media redirection module to intercept the encoded media content or to allow the encoded media content to be processed by the decoding module of the multi-media framework based on one or more monitored parameters.

5. The computer system of claim 4, wherein the one or more monitored parameters are selected from the group consisting of a network parameter between the computer system and the at least one client computer device, a current processing load of the at least one processor of the computer system, a size of the encoded media content, and a user setting of the at least one client computer device.

6. The computer system of claim 4, wherein the operating system is a multi-session operating system configured to concurrently host a plurality of sessions for a plurality of client computer devices.

7. The computer system of claim 6, wherein the at least one processor is configured to determine whether to execute the multi-media redirection module based on an aggregate activity of the plurality of sessions hosted by the multi-session operating system.

8. A method comprising:
at a processor of a server device:
executing a host virtual machine configured to host a session with at least one client computer device, the host virtual machine including an operating system having a multi-media framework for rendering media content;
executing a media application configured to access media content from a media source;
processing encoded media content from the media application using the multi-media framework;
determining whether to execute a multi-media redirection module to intercept the encoded media content or to allow the encoded media content to be processed by a decoding module of the multi-media framework based on one or more monitored parameters, wherein
the multi-media redirection module is configured to intercept the encoded media content from being processed by the decoding module of the multi-media framework, and wherein
the multi-media redirection module is configured to redirect the encoded media content to the at least one client computer device.

9. The method of claim 8, wherein the encoded media content is dynamic streamed media content.

10. The method of claim 8, wherein the encoded media content is received in a media container format that includes two or more of a video stream, an audio stream, and a text stream, and
wherein the method further comprises demuxing the encoded media content in the media container format into independent streams of encoded media content.

11. The method of claim 10, wherein the independent streams of encoded media content include one or more of the video stream, the audio stream, and the text stream.

12. The method of claim 10, further comprising:
buffering the independent streams of encoded media content; and
sending media samples of the buffered independent streams of encoded media content to the at least one client computer device in response to receiving requests for the media samples from the at least one client computer device.

13. The method of claim 12, further comprising sending media samples for each of the independent streams of encoded media content at independent rates based on requests for the media samples received from the at least one client computer device.

14. The method of claim 8, wherein the one or more monitored parameters are selected from the group consisting of a network parameter between the server device and the at least one client computer device, a current processing load of the at least one processor of the server device, a size of the encoded media content, and a user setting of the at least one client computer device.

15. The method of claim 8, wherein the operating system is a multi-session operating system configured to concurrently host a plurality of sessions for a plurality of client computer devices.

16. A server system comprising:
at least one processor configured to execute a host virtual machine that implements a multi-session operating system configured to concurrently host a plurality of sessions for a plurality of client computer devices, the multi-session operating system having a multi-media framework for rendering media content;
wherein the at least one processor is further configured to:
execute an instance of a media application for one or more of the plurality of sessions, the media application being configured to access media content from a media source;
determine that an aggregate activity of the plurality of sessions for the host virtual machine is above a threshold level;
enable multi-media redirection for the one or more of the plurality of sessions based on the determined aggregate activity;
process encoded media content from the instance of the media application using the multi-media framework; and
execute a multi-media redirection module configured to intercept the encoded media content from being processed by a decoding module of the multi-media framework, wherein the multi-media redirection module is configured to redirect encoded media content to respective client computer devices of the one or more plurality of sessions.

17. The server system of claim 16, wherein the encoded media content is in a media container format that includes two or more of a video stream, an audio stream, and a text stream, and
wherein the at least one processor is configured to demux the encoded media content in the media container format into independent streams of encoded media content.

18. The server system of claim 17, wherein the independent streams of encoded media content include one or more of the video stream, the audio stream, and the text stream.

19. The server system of claim 17, wherein the multi-media redirection module is configured to:
buffer the independent streams of encoded media content; and
send media samples of the buffered independent streams of encoded media content to the respective client computer devices of the one or more plurality of sessions in response to receiving requests for the media samples from the respective client computer devices of the one or more plurality of sessions.

20. The server system of claim 19, wherein the multi-media redirection module is configured to send media samples for each of the independent streams of encoded media content at independent rates based on requests for the media samples received from the respective client computer devices of the one or more plurality of sessions.

* * * * *